United States Patent

[11] 3,576,141

| [72] | Inventor | Harold G. Brilmyer |
| | | Grosse Pointe, Mich. |
| [21] | Appl. No. | 885,161 |
| [22] | Filed | Dec. 15, 1969 |
| [45] | Patented | Apr. 27, 1971 |
| [73] | Assignee | Ford Motor Company |
| | | Dearborn, Mich. |

[54] MOTOR VEHICLE STEERING WHEEL ASSEMBLY
7 Claims, 6 Drawing Figs.

| [52] | U.S. Cl. | 74/552 |
| [51] | Int. Cl. | B62d 1/04 |
| [50] | Field of Search | 74/552; |
| | | 180/(Inquired) |

[56] References Cited
UNITED STATES PATENTS

| 1,967,060 | 7/1934 | Mungen | 74/552 |
| 3,209,615 | 10/1965 | Fosnaugh et al. | 74/552 |

*Primary Examiner*—William F. O'Dea
*Assistant Examiner*—F. D. Shoemaker
*Attorneys*—John R. Faulkner and E. Dennis O'Connor ABSTRACT: A motor vehicle steering wheel assembly in which the steering wheel is formed from a steel ring covered with molded plastic material. The wheel is connected to the vehicle steering column by a plurality of spokes secured to the wheel at points about the wheel circumference. Midway between these points of connection between the wheel and the spokes, the steel ring is notched such that it will fracture upon a predetermined load being applied thereto.

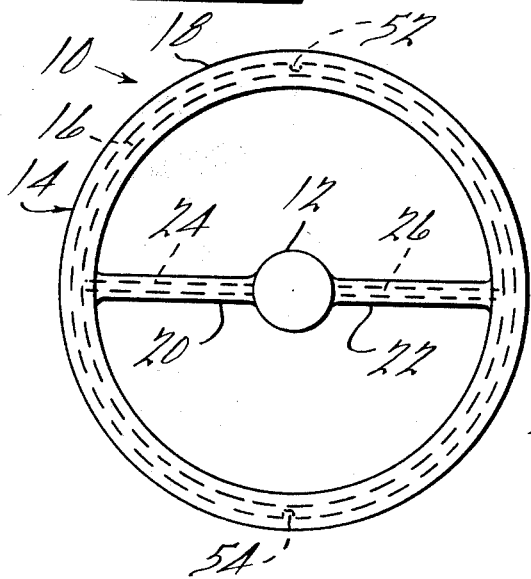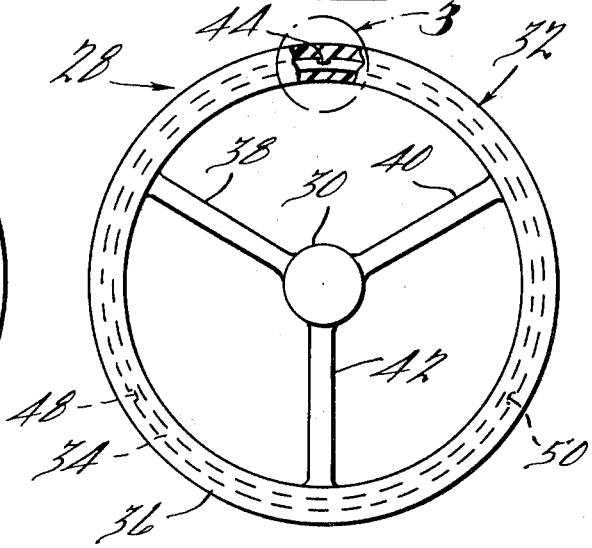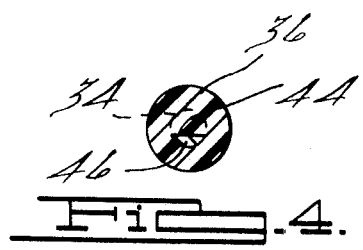

MOTOR VEHICLE STEERING WHEEL ASSEMBLY

BACKGROUND OF THE INVENTION

The prior art details that it is desirable that the elements of motor vehicle steering apparatus present within the vehicle passenger compartment be capable of absorbing energy when impacted. Conventional steering wheels, constructed of material that is permanently deformed when subjected to normal impact loads, are capable of energy absorption.

Such a steering wheel normally is constructed from a structural ring that is covered by decorative material. This wheel is positioned about the extremity of a steering column. Supporting the steering wheel are a plurality (two or three is common) of spokes extending radially from the steering column to the wheel. When subjected to a sufficient impact force, the steering wheel is deformed inelastically and a quantity of energy is absorbed. The deformation of a portion of the steering wheel extending between two adjacent spokes approximates the deformation of a beam supported near both of its ends.

It is an object of this invention to provide a vehicle steering wheel assembly of a design comparable in simplicity and reliability to conventional assemblies of this type, but that includes a steering wheel capable of absorbing a far greater quantity of impact energy than known steering wheels. This is accomplished by providing in the assembly of this invention a steering wheel having portions between adjacent spokes capable of deformation that approximates the deformation of two beams, each one of which is supported at only one of its ends.

SUMMARY OF THE INVENTION

A steering wheel assembly constructed in accordance with this invention is adapted for utilization in a motor vehicle having an elongate steering column. The steering wheel assembly includes a steering wheel extending about the axis of the steering column. This wheel comprises a continuous structural core or ring and a deformable covering surrounding the ring. A plurality of wheel supporting spokes interconnect the steering column and the wheel. The steering wheel ring has a plurality of notched portions, each one of which has a reduced cross section forming a frangible point that will fracture upon a predetermined load being applied to the wheel. One and only one of these frangible points is between adjacent spokes. These frangible points are located midway between the adjacent spokes.

DESCRIPTION OF THE DRAWING

FIG. 1 is a front view of a first embodiment of motor vehicle steering wheel assembly constructed in accordance with this invention;

FIG. 2 is a view similar to FIG. 1, but showing a second embodiment of motor vehicle steering wheel assembly according to this invention;

FIG. 3 is an enlarged view, with parts broken away, of that portion of FIG. 2 included within the circle 3;

FIG. 4 is a sectional view taken along the line 4—4 of FIG. 3;

FIG. 5 is a schematic representation of the deflection due to an impact load of a portion of a conventional motor vehicle steering wheel; and FIG. 6 is a schematic representation of the deflection due to an impact load of a portion of the steering wheel included in the motor vehicle steering wheel assembly of this invention.

DETAILED DESCRIPTION OF THE INVENTION

Referring now in detail to the drawings, the numeral 10 denotes generally a motor vehicle steering wheel assembly adapted to be utilized in a vehicle having an elongated steering column 12. The longitudinal axis of column 12 extends perpendicularly into the plane of the drawing. Assembly 12 includes a steering wheel 14 constructed of an endless structural core comprising a ring 16 that may be formed from steel and is surrounded by a decorative covering 18. This decorative covering 18 may be plastic material that is molded about ring 16. A pair of spokes 20 and 22 extend radially from column 12 and are joined to steering wheel 14 at diametrically opposed points.

Spokes 20 and 22 may be constructed in a manner similar to steering wheel 14 in that they include core members 24 and 26 respectively, and outer plastic material (not numbered). In the alternative, it is within the scope of this invention for spokes 20 and 22 to be solid structural members or any other type of construction that will support steering wheel 14 in the orientation illustrated relative to column 12.

The general construction of the steering wheel assembly 28 illustrated in FIG. 2 is similar to that of assembly 10 in FIG. 1 in that assembly 28 surrounds a column 30 and includes a steering wheel 32. This steering wheel has a structural ring 34 surrounded by molded decorative material 36 and is interconnected with column 30 by three radially extending, equally spaced apart spokes 38, 40 and 42. The construction of these spokes may be the same as spokes 24 and 26 of FIG. 1.

The structure of assemblies 10 and 28 described heretofor is conventional. As may be seen from the drawings, however, the steering wheel rings of these assemblies are particularly modified in order to increase the energy absorbing characteristics of the steering wheels 14 and 32. As best is seen in FIGS. 3 and 4, ring 34 of steering wheel 32 has a notch 44 formed therein that greatly reduces the cross section of this ring at point 46. Point 46 thus becomes an easily frangible point on ring 34 that will fracture upon a predetermined load being applied to the wheel 32. The magnitude of the load sufficient to cause a fracture of ring 34 at point 46 easily may be controlled by varying the material from which ring 34 is constructed and by varying the size of the notch 44 formed therein. Notch 44 is located midway between the intersection of spokes 38 and 40 and wheel 32.

In addition to notch 34, ring 34 also is notched at point 48 midway between the points of intersection of spokes 48 and 42 with wheel 32, and at point 50, midway between the points of intersection of spokes 40 and 42 with wheel 32.

With reference once again to FIG. 1, it may be seen that ring 16 of wheel 14 is notched at point 52, located midway between the points of intersection of the two wheel spokes and the wheel 14, and at a diametrically opposed point 54 located in a similar position relative to these spokes. The significance of the manner in which the structural rings of the steering wheels of FIGS. 1 and 2 are notched will be explained in detail below.

FIG. 5 is a schematic representation of the manner in which a conventional steering wheel portion, located between the two supporting wheel spokes, deflects when an impact load is applied thereto. The steering wheel portion to be deformed is illustrated by the solid line 56 that is supported at points 58 and 60 as by steering wheel spokes. The impact load applied to the steering is represented by the arrows 62. The impact load applied to steering wheel portion 56 causes an inelastic deformation of the steering wheel portion into the position illustrated at 56ʹ. From FIG. 5, it may be seen that this deformation is similar to the deflection of a beam supported at each of its ends.

Attention now is directed to FIG. 6 that illustrates schematically the deflection of a portion of the steering wheel included in the assembly of this invention. A steering wheel portion extending between adjacent spokes is illustrated by the solid line 64. This steering wheel portion is notched at its midpoint 66 as described above in order to form a frangible point prone to fracture when an impact load is applied thereto. Steering wheel portion 64 is supported at its ends at 68 and 70 as by the spokes of the assembly. The impact load applied is illustrated by the arrows 72.

Upon the application of the impact load 72 to the steering wheel portion 64, this portion fractures at point 66 and is divided into two distinct portions that are deflected and are represented by the broken lines 64a and 64b. The deflections of portions 64a and 64b approximate the deflection of loaded beams supported at only one of their ends. As may be seen by a comparison of FIGS. 5 and 6, the deflections of the two loaded beams supported at one of their ends is greater than the deflection of a loaded beam supported at both of its ends. This greater deflection represented in FIG. 6 corresponds to an increased amount of impact energy that is absorbed due to the deflection.

It thus may be seen that the steering wheels assemblies of FIGS. 1 and 2 provide for greater deflection and energy absorption than do conventional steering wheels. This is because the steering wheel portions located between adjacent wheel spokes act under impact loads approximately the same as two separate loaded beams supported at only one of their ends.

The plastic material used to form coverings 18 and 36 is of sufficient resiliency that during the deformation of the steering wheel structural rings, the free end formed by the fracture of these rings do not penetrate through the plastic coverings. Due to this characteristic of the plastic coverings, there is no danger that the fractured ends of the steering wheel ring portions will become free and form a hazardous projection within a vehicle passenger compartment.

It thus may be seen that this invention provides a motor vehicle steering assembly including a steering wheel capable of absorbing greater amounts of impact energy than is absorbed by conventional steering wheels. This greater energy absorption is made possible by the fact that steering wheel portions located between adjacent wheel spokes fracture into two separate portions that react to the impact load in a manner that approximates the reaction of two loaded beams supported at one of their ends.

I claim:

1. A steering wheel assembly for a motor vehicle having an elongate steering column, said assembly comprising a steering wheel extending about the axis of said steering column, said wheel comprising a continuous structural core, a plurality of wheel supporting spokes interconnecting said column and said wheel, said core having portions of reduced cross section forming frangible points that will fracture upon a predetermined load being applied to said wheel, one and only one of said frangible points being located between adjacent spokes.

2. A steering wheel assembly according to claim 1, wherein said core comprises a steel ring, said ring having a covering of plastic material molded thereabout.

3. A steering wheel assembly according to claim 1, wherein each of said frangible points is located equidistant between adjacent spokes.

4. A steering wheel assembly according to claim 3, wherein there are two spokes interconnecting said column and said wheel and three core portions of reduced cross section.

5. A steering wheel assembly according to claim 3, wherein there are three spokes interconnecting said column and said wheel and three core portions of reduced cross section.

6. A steering wheel assembly for a motor vehicle having a steering column, said assembly including a steel ring, a plurality of notches formed in said ring at equally spaced points about said ring, said notches reducing the resistance of said ring to fracture at said points, a decorative covering surrounding said ring, said ring and said covering forming a steering wheel, a plurality of structural elements interconnecting said steering column and said steering wheel, the connections between said structural elements and said steering wheels being located equidistant between said points.

7. The steering wheel assembly of claim 6, wherein said decorative covering comprises plastic material molded about said ring.